Aug. 16, 1966     H. L. POWERS     3,266,297
COMPRESSION LEAK TESTER
Filed Dec. 30, 1963
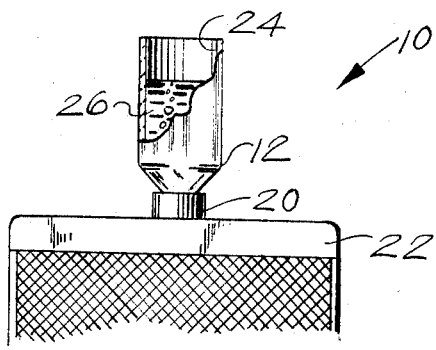
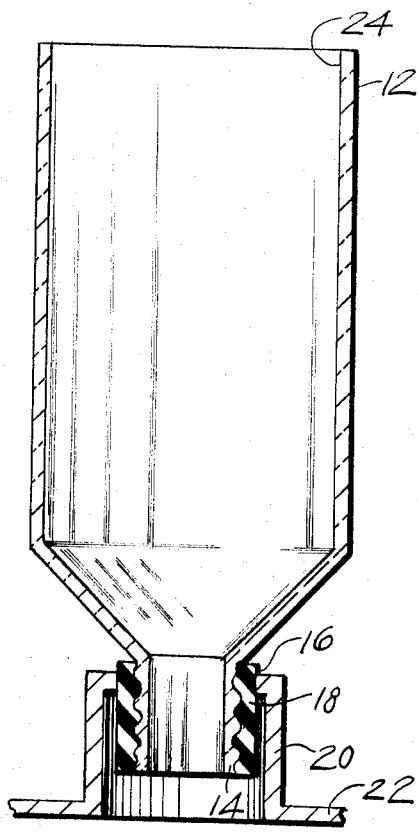
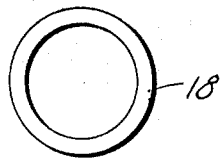

United States Patent Office 3,266,297
Patented August 16, 1966

3,266,297
COMPRESSION LEAK TESTER
Henry L. Powers, P.O. Box 82, Lynnville, Ind.
Filed Dec. 30, 1963, Ser. No. 334,244
1 Claim. (Cl. 73—49.7)

This invention relates to devices for leakage testers, and more particularly to a leak tester for internal combustion engines.

It is a primary object of the present invention to provide a compression leak tester which will be made of plastic or other suitable material which may be inserted into the radiator of the engine through the filler cap neck to provide a visual check as to whether there is a leak in the cooling system of the engine.

Another object of the present invention is to provide a compression leak test which will have a rubber bushing to provide a seal between the engine and the tester in order to get an accurate visual check of the cooling system as to whether there is a leak or not.

A further object of the present invention is to provide a compression leak tester which will save a maximum amount of time in checking the cooling system for leaks.

Other objects of the invention are to provide a compression leak tester bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a front view of a radiator showing the invention in operative use;

FIGURE 2 is a sectional view of the invention; and

FIGURE 3 is a plan view of the gasket shown removed from the invention.

Referring now more in detail to the drawing, a compression leak tester 10 made in accordance with the present invention is shown to include a hollow, clear plastic container 12 having a neck 14 which is provided with a plurality of annular recesses 16 to retain stationary a circular rubber gasket 18 which is received within the filler neck 20 of radiator 22. Gasket 18 provides an airtight seal between container 12 and radiator filler neck 20. An opening 24 in the upper extremity of container 12 provides means for the entrance of water 26 into container 12.

In operation, container 12 is placed with its neck 14 downward into filler neck 20 of the radiator 22, and the gasket 18 provides an airtight seal. Container 12 is then filled approximately half full of water 26, and if there is a compression leak within the engine, air bubbles coming to the surface of water 26 will be visible through the container 12 to inform the mechanic that there is a leak in the system which can then be repaired.

While various changes may be made in the detail construction, it shall be understood that such changes shall be within the spirit and scope of the present invention as defined by the appended claim.

What I claim as new and desire to protect by Letters Patent of the United States is:

A compression leak tester comprising, in combination, a clear plastic container providing container means for water to observe bubbles in internal combustion engine cooling system, a circular rubber gasket carried by said container providing sealing means between the neck of said container and the walls of the filler neck of the radiator of said internal combustion engine, and said gasket of said device is cylindrical in configuration and its outer periphery engages the inner periphery of the upper extremity of the opening of said filler neck to provide an airtight seal between said container and said radiator.

References Cited by the Examiner
UNITED STATES PATENTS

| | | | |
|---|---|---|---|
| 843,873 | 2/1907 | De Veaux | 141—300 |
| 883,289 | 3/1908 | Burg | 141—201 |
| 1,000,150 | 8/1911 | Byrd | 141—344 |
| 2,107,922 | 2/1938 | Westin | 73—37 |
| 3,177,907 | 4/1965 | Baldi | 141—300 |

LOUIS R. PRINCE, Primary Examiner.

J. RENJILIAN, Assistant Examiner.